United States Patent
Funck (10) Patent No.: US 9,999,174 B2
(45) Date of Patent: Jun. 19, 2018

(54) METHOD FOR METERING GRANULAR MATERIAL AND APPARATUS FOR METERING GRANULAR MATERIAL

(71) Applicant: Horsch Maschinen GmbH, Schwandorf (DE)

(72) Inventor: Gerald Funck, Schatthausen (DE)

(73) Assignee: Horsch Maschinen GmbH, Schwandorf (DE)

( * ) Notice: Subject to any disclaimer, the term of this patent is extended or adjusted under 35 U.S.C. 154(b) by 100 days.

(21) Appl. No.: 14/908,630

(22) PCT Filed: Aug. 1, 2014

(86) PCT No.: PCT/EP2014/066658
§ 371 (c)(1),
(2) Date: Jan. 29, 2016

(87) PCT Pub. No.: WO2015/015005
PCT Pub. Date: Feb. 5, 2015

(65) Prior Publication Data
US 2016/0205866 A1   Jul. 21, 2016

(30) Foreign Application Priority Data
Aug. 1, 2013   (DE) .................. 10 2013 215 183

(51) Int. Cl.
*A01C 7/04*   (2006.01)
*A01C 7/08*   (2006.01)
(Continued)

(52) U.S. Cl.
CPC ............... *A01C 7/102* (2013.01); *A01C 7/04* (2013.01); *A01C 7/081* (2013.01); *B65G 53/16* (2013.01); *B65G 53/58* (2013.01); *B65G 53/66* (2013.01)

(58) Field of Classification Search
CPC .. A01C 7/04; A01C 7/00; A01C 7/081; A01C 7/08; A01C 7/102; A01C 7/10;
(Continued)

(56) References Cited

U.S. PATENT DOCUMENTS 6,564,730 B2   5/2003   Crabb et al.

FOREIGN PATENT DOCUMENTS

DE   3001926 A1   7/1981
EP   0963690 A1   12/1999
(Continued)

OTHER PUBLICATIONS

English language translation of the International Preliminary Report on Patentability and Written Opinion issued by WIPO dated Feb. 2, 2016 for corresponding International Application No. PCT/EP2014/066658.
(Continued)

*Primary Examiner* — Christopher J. Novosad
(74) *Attorney, Agent, or Firm* — Erickson Kernell IP, LLC (57) ABSTRACT

A method for metering granular material, such as seeds, fertilizer, or the like. By way of the method, the granular material being carried and conveyed by an airflow is directed through a feed tube into a metering unit, and guided therein along an approximately circular arc path and tangentially directed into an outlet tube, which is adjacent to the metering unit. The airflow being guided through the outlet tube and carrying and conveying the granular material, which is being conveyed in approximately equal spacing, is conveyed and/or accelerated within the metering unit by means of at least one conveyor disk or fan disk, which is electromotively driven at a regulatable rotational speed and which rotates approximately concentrically within the metering unit. The drive speed is increased or reduced based (Continued)

on a detected torque of the electromotive drive of the at least one rotating conveyor disk or fan disk.

24 Claims, 3 Drawing Sheets

(51) Int. Cl.
*A01C 7/10* (2006.01)
*B65G 53/16* (2006.01)
*B65G 53/58* (2006.01)
*B65G 53/66* (2006.01)

(58) Field of Classification Search
CPC ........ B65G 53/16; B65G 53/04; B65G 53/00;
B65G 53/58; B65G 53/34; B65G 53/66
See application file for complete search history.

(56) References Cited

FOREIGN PATENT DOCUMENTS

| | | |
|---|---|---|
| EP | 1234489 A2 | 8/2002 |
| WO | 2004004441 A1 | 1/2004 |
| WO | 2012167372 A1 | 12/2012 |

OTHER PUBLICATIONS

English translation of International Search Report dated Oct. 28, 2014 for corresponding International Application No. PCT/EP2014/066658.

METHOD FOR METERING GRANULAR MATERIAL AND APPARATUS FOR METERING GRANULAR MATERIAL

CROSS-REFERENCE TO RELATED APPLICATIONS

This application claims priority from German Application No. DE 10 2013 215 183.7 filed Aug. 1, 2013, the contents of which are incorporated herein by this reference.

The present invention relates to a method for metering granular material, such as seeds, fertilizer, or the like, as well as to a metering apparatus for such granular material with the features of the independent claims. The granular material is carried and conveyed by an airflow and directed through a feed line into a metering unit and then directed to an outlet tube tangentially adjacent to the metering unit, which outlet tube runs, at least in sections, in a straight line or slightly curved. The rotational speed of the electromotive drive is adjusted by means of a regulation arrangement depending on a detected torque of an electromotive drive for a conveyor disk or fan disk rotating in the metering unit.

Various approaches are known from the prior art for improving seed drilling to the effect that sowing is carried out more evenly. The most important objective pursued in this context lies in not letting the grain distances vary too much within a row in order to thus at least roughly approximate a single grain sowing.

WO 2012/167372 A1 discloses a delay device for granular material being carried in an air stream, which delay device is combined with a furrow-forming depositing apparatus for placing the granular material into the ground. The delay device is part of an agricultural distribution system, which works with air as a carrier medium.

Presented in U.S. Pat. No. 6,564,730 B2 is a metering unit of an agricultural sowing apparatus in which the granular material to be spread or the seeds, respectively, is or are moved and conveyed within the metering unit by means of a conveyor disk with air intake openings, which conveyor disk concentrically rotates within the metering unit.

EP 0 963 690 A1 finally discloses a centrifugal spreader for distributing spreading material with a variable working width. For a distribution disk that is electromotively driven at a regulatable rotational speed, the drive speed is increased or reduced based on a detected torque of the electromotive drive.

Since single grain sowing has not yet been able to prevail due to economic reasons, the present method, according to the invention, attempts to improve the grain singulation for pneumatically supported sowing in customary seed-drill machines so far that it can be referred to as a largely equidistant sowing, i.e. as largely constant grainspacing, which comes at least very close to single grain sowing.

The present invention thus provides a method for metering granular material, such as seeds, fertilizer, or the like. The method can be applied, in particular, within a distribution unit or sowing unit of a distribution machine or sowing machine. By way of the method, the granular material being carried and conveyed by an airflow is directed through a feed tube into a metering unit, where it is guided along an approximately circular arc path and tangentially directed into an outlet tube, which is adjacent to the metering unit. The airflow being guided through the outlet tube and carrying and conveying the granular material, which is being conveyed in approximately equal spacing, is moved and/or circulated or also accelerated, as the case may be, within the metering unit by means of at least one conveyor disk or fan disk, which is electromotively driven at a regulatable rotational speed and which rotates approximately concentrically within the metering unit. Based on a detected torque of the electromotive drive of the at least one rotating conveyor disk or fan disk, the drive speed is, in addition, increased or reduced so far until the detected torque is within a definable target range. The drive speed is increased if an increased torque, which is above the target range, is measured as well. By contrast, the drive speed is reduced if a lower torque, which is below the target range, is measured as well. The increase or reduction of the rotational speed can be optionally carried out continuously or also at predefinable intervals. The outlet tube, which leads from the metering unit, can optionally run straight or also slightly curved, at least in sections.

A variant of the method provides that the sensor values of a grain flow sensor arranged in the outlet tube are additionally analyzed and used for the regulation of the drive speed. Preferably, each of a plurality of meters can be associated with respectively one drive motor for its rotating conveyor disk or fan disk as well as with a corresponding device for torque detection, as the case may be, also with one grain flow sensor in the outlet tube. This device for torque detection is normally associated with the power consumption of the drive motor being detected, from which power consumption, the torque to be delivered by the motor can be directly derived.

It can furthermore be advantageous to also provide such grain flow sensors in the feed tube to the metering unit so that a facilitated control based on these grain flow sensors is made possible. Under certain conditions, it can thus be prevented that individual metering units are charged with too large a quantity of grains and thus plugged up, which cannot be detected with the same reliability by a grain flow sensor in the outlet tube, or, respectively, it can only be detected too late, when blockages have already occurred. Such quantity sensors can operate, for instance, inductively or with impact surfaces, which can detect the grain quantities respectively passing through the tubes.

In the metering apparatuses, the approximately evenly metered and/or equidistantly spaced granular material is respectively carried by the airflow being discharged and largely completely exiting the metering unit through the outlet tube. The granular material is guided within the individual metering units, respectively, with mechanical support and/or under at least partial separation from the carrying airflow along an inner cover surface or inner wall, with approximately equal spacing from one another being imposed on the individual grains approaching the outlet tube. In the process, the airflow carrying the granular material is guided uninterruptedly from the feed tube, through the metering unit, and to the outlet tube. Normally, the airflow carrying and conveying the granular material is guided uninterruptedly from the feed tube, through the metering unit, and to the outlet tube such that by an influence or variation, respectively, of the drive speed of the rotating conveyor disk or fan disk, a corresponding variation of the grain throughput can be achieved.

Since the airflow being guided through the outlet tube and carrying and conveying the granular material, which is being conveyed in approximately equal spacing, is moved, circulated and/or accelerated within the metering unit by means of the electromotively driven conveyor disk or fan disk, the drive torque of these drives for the disks can be both detected and their rotational speed adjusted such that the grain flow can be carried out largely evenly and the grains can be released at approximately equalspacing. Typically, the airflow, which is accelerated in the metering unit, enters into and exits from the outlet tube at a speed that is greater than a feed speed at which the airflow enters into the feed tube.

As already defined, the granular material can be guided within the metering unit with mechanical support and/or under at least partial separation from the carrying airflow along an inner cover surface or inner wall, with approximately equal spacing from one another being imposed on the individual grains approaching the outlet tube typically until a variation of the drive speed of the conveyor disk or fan disk is carried out. By means of the rotating conveyor disk or fan disk, the airflow being guided through the outlet tube and carrying and conveying the granular material, which is being conveyed in approximately equal spacing, can be accelerated within the metering unit such that, in dependence on the design of the metering unit, the airflow being conveyed and/or accelerated in the metering unit enters into and exits from the outlet tube at a speed that is greater than a feed speed at which the airflow enters into the feed tube. The acceleration of the grain-conveying air can, however, additionally be influenced by the different tube cross sections because the outlet tube normally has a smaller cross section than the feeding tube or the seed tube, respectively, which leads, for instance, from a central distributor head to the seed drill coulters. The grain is accelerated in the metering apparatus and is already surrounded therein by the airflow, which conducts and carries the grains into the downpipe and to the seed drill coulter.

The invention in addition relates to a regulatable arrangement for metering granular material, such as seeds, fertilizer, or the like, in particular within a distribution unit or sowing unit of a distribution machine or sowing machine, in which the granular material being carried and conveyed by an airflow is directed through a feed tube into a metering unit, where it is guided in an approximately circular arc path and tangentially directed into an outlet tube, which is adjacent to the metering unit, with at least one conveyor disk or fan disk, which is electromotively driven at a regulatable rotational speed and which rotates approximately concentrically within the metering unit, for the movement, circulation, and/or acceleration within the metering unit of the airflow being guided through the outlet tube and carrying and conveying the granular material, which is being conveyed in approximately equal spacing, and with devices for detecting a torque of the electromotive drive for the at least one rotating conveyor disk or fan disk and for varying the drive speed if a detected torque is outside of a definable target range. The arrangement has devices for the detection of sensor values of a grain flow sensor arranged in the outlet tube and for the evaluation for regulating the drive speed.

Generally, the spreading rate of the granular material or the seeds, respectively, is regulated by means of the degree of filling of the meter. The greater the degree of filling with seeds in the meter, the more grains are separated and spread. Since each meter has a separate drive motor by which the meter or the fan disk in the meter, respectively, is driven, the drive torque of this drive motor can be detected and used for regulating the spreading rate. Since the drive torque of the motor increases with the degree of filling of the meter, the detected torque can be used as measured for determining and regulating the degree of filling. In this manner, the quantity that is spread can be regulated; i.e. for a certain spreadingrate, the torque of the drive motor may only have a certain value.

As mentioned above, the present drive torque of the electric drive motor is in particular determined by or derived from measuring its electric current consumption because this allows drawing an immediate conclusion relating to the motor resistances and thus to the motor torque to be applied.

The object of an improved evenness of the seeds being spread can be achieved by an adjustment of the motor speed on the basis of the measured drive torque, whereby stronger fluctuations in the spreading rate of an individual meter can be compensated for or suppressed in a desired manner. Although the spreading rates can still vary between the individual rows in this manner, the object of optimized and preferably non-fluctuating grain spacing within the row is achieved.

The supply for the meters is carried out via the already present air supply of a pneumatic sowing machine, which typically has a central distributor head with flexible seed tubes leading to the individual seed drill coulters. By means of this pneumatic system, all coulters and meters are supplied with seeds as evenly as possible. The individual meters are placed inline with these flexible seed tubes, typically close to the seed drill coulters, since the downpipes to the seed drill coulters normally are the outlet tubes of the meters.

In addition, grain sensors for monitoring the grain quantities released by the meter can be arranged in the downpipes such that these sensor values can be used for the further regulation of the drive motors.

The regulation method according to the invention is, in particular, part of a method for metering granular material, such as seeds, fertilizer, or the like. This method can be carried out, in particular, within a distribution unit or sowing unit of a distribution machine or sowing machine. It is provided by way of the method that the granular material being carried and conveyed by an airflow is tangentially directed through a feed line running, at least in sections, in a straight line, into a metering unit, where it is guided along an approximately circular arc path with an arc angle of at least 180 degrees, preferably of 270 degrees or more, under at least partial separation of the granular material from the carrying and conveying airflow and tangentially directed into an outlet tube, which is adjacent to the metering unit and which runs, at least in sections, in a straight line or slightly curved, as the case may be, with the granular material, which is approximately evenly metered and/or equidistantly spaced therein, being carried by the airflow being discharged and largely completely exiting the metering unit through the outlet tube. The granular material or the seeds as well as the airflow carrying the material can execute, for instance, a complete rotation in the metering unit, which preferably has a disk-shaped construction, before being lead into the outlet tube. It can thus be provided in the method that the airflow, which is tangentially directed into the metering unit, is there guided along an approximately circular arc path with an arc angle of approximately 330 to 390 degrees or more, and tangentially directed into the outlet tube. Since the air stream is not interrupted at any point, but rather directed uninterruptedly and along a largely evenly curved path (with tangential passages) through the metering unit, the airflow, which is in this manner greatly steadied and homogenized, can be used, in connection with steering, directing, and/or separating effective elements within the metering unit, for largely homogenizing the grain spacing such that the grains, which are guided through the outlet tube, have both largely the same grain velocities and largely the same spacing from one another.

Optionally, the granular material can be guided within the metering unit with mechanical support and/or under at least partial separation from the carrying airflow along an inner cover surface or inner wall, with approximately equal spacing from one another being imposed on the individual grains approaching the outlet tube. In connection therewith, it can be provided that the airflow is guided in an internal area of the metering unit and at least partially spaced apart from the grain-conducting areas of the inner cover surface or inner wall. In this context, it is essential for the effect achieved by the invention that the airflow carrying the granular material is guided uninterruptedly from the feed tube, through the metering unit, and to the outlet tube.

By accelerating the airflow within the metering unit, which airflow is being guided through the outlet tube and carrying and conveying the granular material, which is conveyed in approximately equal spacing, which acceleration can be carried out, for instance, by means of a rotating conveyor disk and/or fan disk, the power required for this or the torque to be delivered for this, respectively, can be detected, which in turn allows drawing a conclusion relating to the filling of the metering unit. In this manner it can be achieved that the airflow having been accelerated in the metering unit enters into and exits from the outlet tube through an outlet at a speed that is greater than a feed speed at which the airflow enters into the feed tube. The torque detection and the rotational speed regulation of the conveyor disk or fan disk derived therefrom serves for homogenizing the seed release or grain release being directed to the seed drill coulter.

In the grain separating method, the granular material being approximately equidistantly spaced and/or evenly metered and conveyed in an outer area of the curved outlet tube is carried largely or completely by the airflow being discharged from and exiting the metering unit through the outlet tube. Preferably, largely all of the air stream is guided in and directed through the metering unit. It can furthermore be provided that the circular arcs of the outlet tube and the inner cover surface of the metering unit tangentially touch and that the air-guiding path and the grain-guiding path steplessly or seamlessly merge into each other. It is optionally possible that a radius of curvature of the outlet tube opens continuously or discontinuously with increasing distance from the metering unit. Alternatively, the radius of curvature of the outlet tube can be approximately constant, at least in a section abutting the metering unit. By means of the method according to the invention, the granular material to be spread can be guided in the outlet tube largely collision-free and/or swirl-free, as it approximately follows the path of the outlet tube in its movement path. A velocity gradient of the airflow being guided in the outlet tube, which velocity gradient increases from the inner to the outer radius, is advantageous for a largely collision-free course of movement of the grains within the outlet tube. This means that the air carrying the grains, which is closer to the outer radius, flows faster than the air being guided along the inner radius.

If a largely collision-free grain conveyance is referred to in the present context, this relates to collisions of the grains among each other, which can be largely prevented by means of the method according to the invention as well as by means of the operation of the metering apparatus according to the invention. An approximately swirl-free grain conveyance accordingly relates to a grain transport, which approximately follows the tube path of the feed tube and of the outlet tube as well as the circular movement path along the housing of the metering unit.

The described metering apparatus is particularly suitable for placement inline with grain-conducting tubes, in particular inline with seed tubes of a per se known sowing machine, in particular of such a one that conveys pneumatically. Such a metering apparatus can be arranged inline with each seed tube, where it can provide for ensuring a distribution approximating single seed distribution. The metering apparatus therefore is an accessory equipment that is suitable for supplementing an existing sowing machine and thus turning it into a single grain sowing machine.

The airflow carries and conveys the granular material during its entire transport from the grain supply to the seed drill coulter, with the airflow being guided along an approximately circular arc path within the metering unit and being tangentially conducted into an outlet tube, which is adjacent to the metering unit and which runs slightly curved, at least in sections. In this context it can be provided that the circular arcs of the outlet tube and the inner cover surface of the metering unit tangentially abut and that the air-guiding path and the grain-guiding path steplessly/seamlessly merge into each other. Also, a radius of curvature of the outlet tube is approximately constant, at least in a section abutting the metering unit. It can optionally be provided that the radius of curvature of the outlet tube opens continuously or discontinuously with increasing distance from the metering unit.

Due to the regulation possibility supplied by the invention for the longitudinal distribution of seeds or for the grain spacing, respectively, during a sowing operation, the present invention as a further aspect provides a spreading apparatus for granular material in at least two, in particular, in a multitude of rows that are located adjacent to each other, which spreading apparatus can, in particular, be formed by a multiple-row sowing apparatus. The spreading apparatus or sowing apparatus also comprised by the present invention has a plurality, in particular, a multitude of rows or sowing rows with respectively one sowing unit and/or one seed drill coulter or the like apparatus for placing the grains or the seeds into the soil at a definable placement depth, with these sowing units and/or seed drill coulters being supplied with grains or seeds via respectively separate feed tubes from a central tank or from a plurality of grain storage hoppers, as the case may be. In addition, each of these sowing units and/or seed drill coulters is equipped with one metering apparatus for granular material according to the definition of one of the above described alternative embodiment or according to one of the claim 14 or 15, respectively, which metering apparatuses are respectively connected, in terms of signal technology, with a central control unit and/or regulating unit, which not only detects and processes the torques and/or rotational speed values, which are detected in the metering apparatuses, for the drive motors of the rotating fan disks or conveyor disks, but also regulates and adjusts the rotational speeds of the drive motors if necessary and/or according to predefined grain spacings under consideration or further spreading parameters, such as a driving speed. Alternatively, additional sensor values from optional flow rate sensors can be analyzed, which flow rate sensors are located, for instance, in sections of the grain tubes arranged downstream and/or upstream from the metering apparatuses, and which can detect both the passing grains per time interval and the grain spacing, for instance, by means of optical, inductive, or also mechanical detection. Mechanical detection can be carried out, for instance, by means of so-called impact sensors, which have, for instance, a piezoelectrically operating impact surface, at which the impacting grains can be deflected and detected by means of the mechanical impact.

By the corresponding configuration of the control unit and/or regulating unit, an entire sowing apparatus or spreading apparatus for granular material or a multi-row sowing machine, respectively, which is equipped with a multitude of metering apparatuses according to the invention, can thus be variably controlled or regulated with regard to its grain quantity per seed row and in particular also with regard to the longitudinal distribution of the grains or seeds.

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

The same or equivalent elements of the invention are designated by identical reference characters. Furthermore and for the sake of clarity, only the reference characters relevant for describing the respective figure are provided. It should be understood that the detailed description and specific examples of the device and method according to the invention, while indicating preferred embodiments, are intended for purposes of illustration only and are not intended to limit the scope of the invention.

Figure 1:
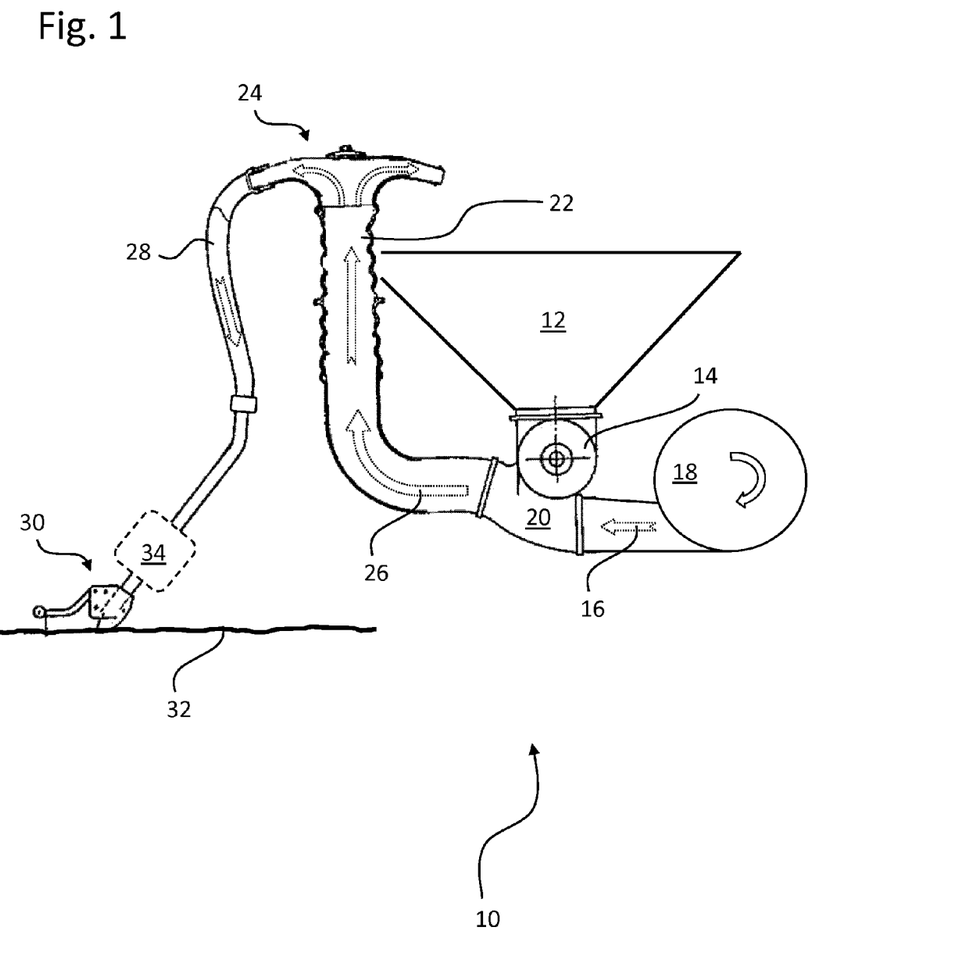
FIG. 1 shows a schematic illustration of a pneumatically operating sowing machine with volumetrically-metered seeds, which are guided via a central distributor to individual seed tubes with seed drill coulters arranged thereat on the side of the outlets.

The schematic illustration of FIG. 1 shows a pneumatically operating sowing machine 10 with volumetrically-metered seeds, which are guided via a central distributor to individual seed tubes with seed drill coulters arranged thereat on the side of the outlets. The sowing machine 10, the basic construction of which is known from the prior art, typically has a funnel-shaped storage hopper 12 for granular material, in particular for seeds, at the underside of which storage hopper 12 is a metering device 14, which meters the granular material or the seeds, respectively, into an air stream 16, which is generated by an air blower 18 and conveyed into an air duct 20, which leads to a vertically arranged riser pipe 22. A central distributor 24 is arranged at a top side of the riser pipe 22—which can be, for instance, a so-called corrugated pipe or the like—which central distributor 24 distributes the grain-bearing air stream 26 as evenly as possible to a multitude of seed tubes 28. The individual seed tubes 28, only one of which is shown for the sake of clarity, each eventually lead to seed drill coulters 30 with which the seeds are placed into the soil 32. The metered feeding of the seeds or granular material released from the storage hopper 12 into the air stream 16 can be optionally carried out according to the Venturi principle or also by support of the seeds that are located, under pressure, in the closed pressure tank 12.

As can be discerned from FIG. 1, a metering apparatus 34 according to the invention is located in line with the seed tube 28, typically in the immediate vicinity to the seed drill coulter 30, which metering apparatus 34 provides for supplying the seed drill coulter 30 with granular material or with seeds, respectively, which is or are released at approximately equal grain spacing and at largely the same respective conveying speeds into the soil 32. Since in a real sowing machine a multitude of such parallel seed drill coulters 30 are provided (for example twenty-four, thirty-two, or more), which are each connected with separate seed tubes 28 and supplied by them, a corresponding number of metering apparatuses 34 according to the invention, which are each constructed in the same manner, are also provided, because each individual seed tube 28 has such a metering apparatus 34.

Figure 2:
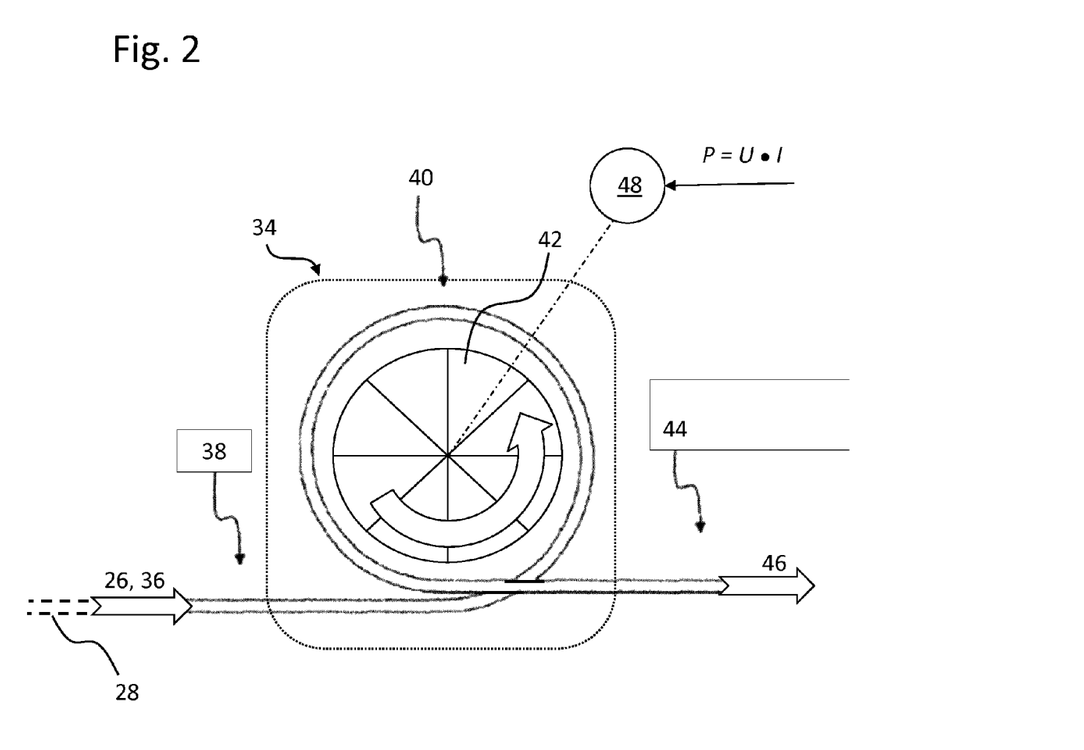
FIG. 2 shows the basic construction of a metering apparatus according to the invention in a schematic illustration, which metering apparatus is arranged in line with a seed tube of a sowing machine according to FIG. 1.

FIG. 2 shows the basic construction of a metering apparatus 34 according to the invention in a schematic illustration, which metering apparatus 34 is arranged in line with a seed tube 28 of a sowing machine 10 according to FIG. 1. The grain-bearing air stream 26 thus tangentially streams as feed air 36 at a first speed $v_1$ through a feed tube 38 arranged in line with the seed tube 28 into the metering apparatus 34, wherein the feed air 36 can be accelerated by means of a conveyor disk and/or fan disk 42 rotating in the metering unit 40 of the metering apparatus 34. The grains (for instance, seeds) being carried and conveyed in the feed air 36 are thereby simultaneously sorted and brought into an order relative to each other in such a manner that they have approximately the same spacing from each other upon tangentially exiting the metering unit 40 into an outlet tube 44. The conveying air 46 or grain-bearing airflow, which is accelerated in the metering unit 40, exits from the outlet tube 44 at a higher speed ($v_2$) than that at which it enters into the feed tube 38, such that the following applies:

$$v_2 > v_1.$$

Both the feed tube 38 and the outlet tube 44 end respectively approximately tangentially at the metering unit 40 of the metering apparatus 34, in which the air, together with the carried and conveyed grains, undergoes a deflection of preferably at least 330 degrees, typically of approximately 360 degrees. The outlet tube 44 can subsequently lead into a seed tube (cf. FIG. 3), which leads to the seed drill coulter 30 (cf. FIG. 1), with which the grains are placed into the soil 32. The outlet tube 44 can optionally have a crescent-shaped curvature, which takes up the curvature of the air conveyance path within the metering unit 40 and continues it with a larger radius of curvature.

As can be discerned from the schematic illustration of FIG. 2, the air stream is guided uninterruptedly from the supply (air blower 18) to the release at the seed drill coulter 30 (cf. FIG. 1) such that the complete air stream passes through the entire system before exiting at the seed drill coulter 30 together with the transported and largely equidistantly released grains.

The conveyor disk and/or fan disk 42 in the metering unit 40 is electromotively driven, which is carried out via the schematically indicated electric drive motor 48. Normally, the grains are—at least partly—separated from the air stream within the metering unit 40, where the grains being guided on the outside also describe a circular arc movement when they are guided along the inner cover surface of the metering unit 40. The air stream is normally guided on a smaller radius in the inner area of the metering unit 40 and can swirl there, as the case may be, before again carrying away the grains having been delivered into the outlet tube 44 at its tangential outlet, which grains were previously accelerated by the metering unit 40 and are continuously surrounded by flowing air. The grains being conveyed with the air 46 exiting through the outlet tube 44 are particularly suited for the precise placement into the soil 32 because their speed and position are controllable very accurately. The method shown provides for the desired grain acceleration within the metering unit 34 or 40, respectively, and can largely do without further auxiliary means, such as an additional air supply.

The seeds initially move at a constant speed ($v_1$), which is predetermined by the air speed of the conveying air 26. This conveying air 26 originates from the central air supply of the pneumatic sowing machine 10, in which the grains are metered into the air stream 16, which originates from the air blower 18 (Venturi principle or pressure tank principle). The air speed is increased in the metering apparatus 34 by the rotation of the mechanically operated conveyor disk/fan disk 42, whereby the air speed ($v_2$) of the air exiting from the outlet tube 44 is increased and thus also the conveying speed for the grains. These are subsequently released nearly without breaking to the seed conduit.

The power consumption of the electric drive motor 48 is detected, the detection being carried out at a given supply voltage U, for instance, by measuring the current consumption I such that the power consumption P can be derived or calculated, respectively, from the known product $$P = U \cdot I.$$

Since the power consumption P in the metering unit 40 according to the invention provides a direct correlation to the torque to be delivered by the motor, the grain flow within the metering unit 40 can be stabilized by the drive speed being increased or reduced on the basis of a detected torque of the electromotive drive 48 for the rotating conveyor disk or fan disk 42 until the detected torque is within a definable target range. The drive speed is increased if an increased torque, which is above the target range, is measured as well. By contrast, the drive speed is reduced if a lower torque, which is below the target range, is measured as well. The increase or reduction of the rotational speed can be optionally carried out continuously or also at predefinable intervals.

In the manner described, the spreading rate of granular material or seeds, respectively, can be regulated by means of the degree of filling of the metering apparatus 34. The greater the degree of filling with seeds in the meter 34, the more grains are separated and spread. Since each meter 34 or each metering unit 40, respectively, has a separate drive motor 48 by which the fan disk 42 in the metering unit 40 is driven, the drive torque of this drive motor 48 can be detected and used for regulating the spreading rate. Since the drive torque of the motor 48 increases with the degree of filling of the meter 34, the detected torque can be used as measured for determining and regulating the degree of filling. In this manner, the quantity that is spread can be regulated; i.e. for a certain spreading rate, the torque of the drive motor 48 may only have a certain value. The object of an improved evenness of the seeds being spread can be achieved by an adjustment of the motor speed on the basis of the measured drive torque, whereby stronger fluctuations in the spreading rate of an individual meter can be compensated for or suppressed in a desired manner. Although the spreading rates can still vary between the individual rows in this manner, the object of optimized and preferably non-fluctuating grain spacing within the row is achieved.

Optionally, grain sensors (not illustrated here) for monitoring the quantity of grain released by the meter can be arranged in the downpipes such that these sensor values can be used for the further regulation of the drive motors 48.

Figure 3:
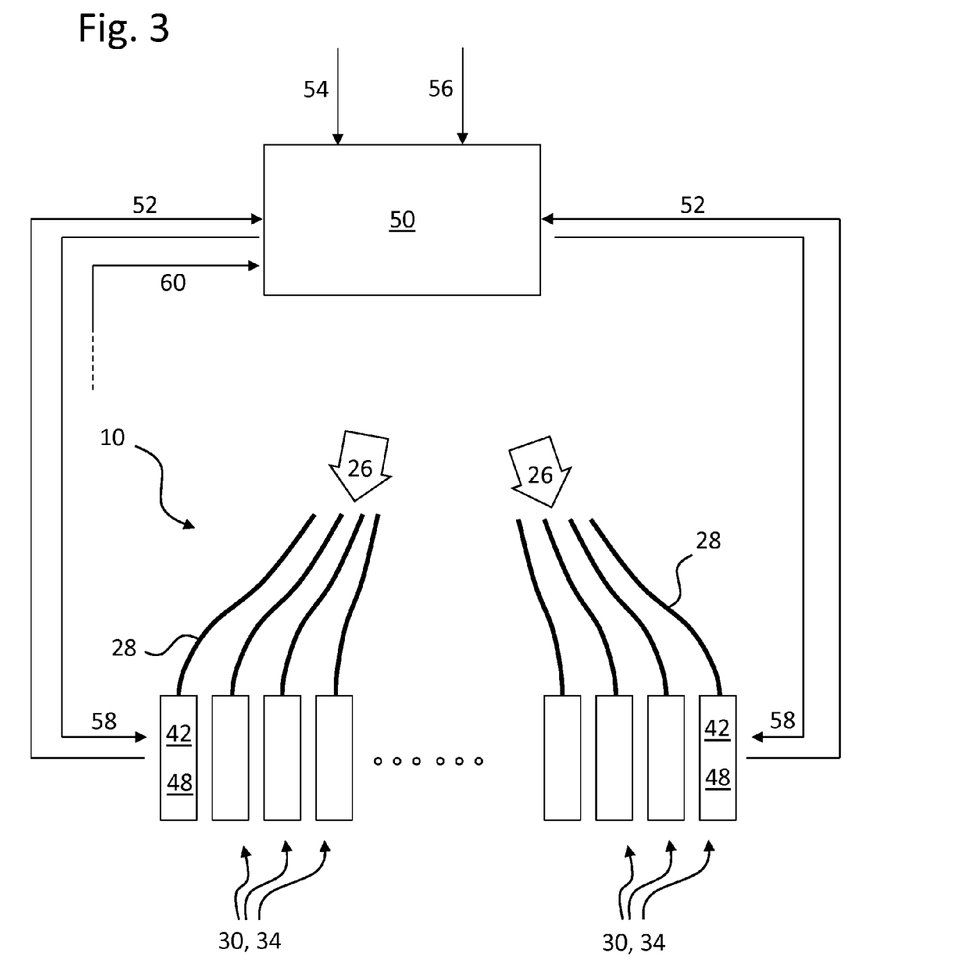
FIG. 3 shows a schematic illustration of an alternative embodiment of a sowing machine with a plurality of sowing units, which are each equipped with metering apparatuses according to FIG. 2.

In a further schematic illustration, FIG. 3 shows an alternative embodiment of a sowing machine 10, which is equipped with a plurality of seed drill coulters arranged next to each other, and upstream from which each of the metering apparatuses 34 according to FIG. 1 or FIG. 2, respectively, is arranged. The configuration of the seed drill coulters 30 or the sowing units, respectively, and of the metering apparatuses 34 is without relevance for the following explanation of the alternative embodiment of the invention and can correspond, for example, to the arrangement according to FIG. 1. The seed tubes 28 leading to the sowing units or to the metering apparatuses 34, respectively, through which seed tubes 28 the grain-bearing air stream 26 is directed to the metering apparatuses 34, are only indicated in FIG. 3. The seed tubes 28 can be supplied from a central storage hopper or also from a plurality of supply tanks with seeds located therein (cf. FIG. 1).

According to the embodiment variant shown in FIG. 3, the metering apparatuses 34 are respectively connected, in terms of signal technology, with a central control unit and/or regulating unit 50, which, on the one hand, detects and processes the torques 52 and/or rotational speed values, which are detected in the metering apparatuses 34, for the drive motors 48 of the rotating fan disks or conveyor disks 42 (cf. FIG. 2). If necessary and/or according to predefined grain spacings, further spreading parameters, such as a driving speed 54, can furthermore be detected. The rotational speeds of the drive motors 48 are regulated and adjusted in the desired manner in dependence on the detected values 52, 54 and under consideration of target values 56 for the grain spacing or the respective longitudinal distribution of the spread grains in the furrow, respectively. The regulation specifications for the drive motors 48 in the metering apparatuses 34 are denoted by the reference numbers 58. The target values 56 are derived from, for instance, characteristic values and/or from specifications from the user, who can enter these manually.

Optionally, additional sensor values 60 from optional flow rate sensors (not illustrated here) can be analyzed, which flow rate sensors are located, for instance, in sections of the grain tubes arranged downstream from the metering apparatuses 34, and which can detect both the passing grains per time interval and the grain spacing, for instance, by means of optical, inductive, or also mechanical detection. By the corresponding configuration of the control unit and/or regulating unit 50, an entire, multi-row sowing machine 10, which is equipped with a multitude of controllable and regulatable metering apparatuses 34, can thus be variably controlled or regulated, respectively, with regard to its grain quantity per seed row and in particular also with regard to the longitudinal distribution of the grains or seeds.

It can furthermore be advantageous to also provide such flow rate sensors or grain flow sensors in the respective feed tubes or seed tubes 28 to the metering unit 34 so that a facilitated control based on these grain flow sensors is made possible. Under certain conditions, it can thus be prevented that individual metering units 34 are charged with too large a quantity of grains and thus plugged up, which, according to measuring conditions, cannot be detected with the same reliability by a grain flow sensor in the outlet tube 44. Such quantity sensors can operate, for instance, inductively or with impact surfaces, which can detect the grain quantities respectively passing through the tubes.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

10 Sowing machine
12 Storage hopper
14 Metering device
16 Air stream
18 Air blower
20 Air duct
22 Riser pipe (corrugated pipe)
24 Central distributor, central distribution
26 Grain-bearing air stream, grain-bearing airflow
28 Seed tube
30 Seed drill coulter
32 Ground, soil
34 Metering apparatus
36 Feed air, feed airflow
38 Feed tube
40 Metering unit
42 Disk, conveyor disk, fan disk
44 Outlet tube
46 Exiting air (air exiting the metering apparatus)
48 Drive motor, electric drive motor
50 Central control unit and/or regulating unit
52 Torque, torque value
54 Running speed
56 Target values
58 Regulation specifications, control data
60 Additional sensor values

The invention claimed is:

1. A method for metering granular material within a distribution unit of a distribution machine wherein the granular material is carried and conveyed in approximately equal spacing by an airflow directed through a feed line and into a metering unit wherein the airflow and granular material is guided within the metering unit along an approximately circular arc path and is tangentially directed into an outlet tube positioned adjacent to the metering unit, wherein the airflow carrying and conveying the granular material directed through the outlet tube is moved within the metering unit by means of at least one conveyor disk or fan disk, which is electromotively driven at a regulatable rotational speed and which rotates approximately concentrically within the metering unit, and wherein the rotational speed of the at least one conveyor disk or fan disk is increased or reduced based on a torque of an electromotive drive of the at least one rotating conveyor disk or fan disk.

2. The method as recited in claim 1, wherein the torque of the electromotive drive is derived from its electrical current consumption.

3. The method as recited in claim 1, wherein the rotational speed of the electromotive drive is increased or reduced based on a detected torque of the electromotive drive until the detected torque is within a definable target range.

4. The method as recited in claim 1, wherein the rotational speed of the electromotive drive is increased when the torque is above a target range.

5. The method as recited in claim 4, wherein the rotational speed of the electromotive drive is approximately continuously increased or reduced.

6. The method as recited in claim 4, wherein the rotational speed of the electromotive drive is increased or reduced at pre-definable intervals.

7. The method as recited in claim 1, wherein the rotational speed of the electromotive drive is reduced when the torque is below a target range.

8. The method as recited in claim 1, wherein values from a grain flow sensor arranged in the outlet tube are analyzed and used in the regulation of the rotational speed of the electromotive drive.

9. The method as recited in claim 1, wherein the approximately equally spaced and conveyed granular material is carried entirely or in part by airflow discharged and exiting the metering unit through the outlet tube.

10. The method as recited in claim 1, wherein the granular material is guided within the metering unit at least in part via mechanical support and is carried along an inner surface, wherein approximately equal spacing of individual grains of the granular material is imposed as the grains approach the outlet tube.

11. The method as recited in claim 1, wherein the airflow carrying the granular material is guided uninterruptedly from the feed line through the metering unit, and to the outlet tube.

12. The method as recited in claim 1, wherein the airflow guided through the outlet tube and carrying and conveying the granular material is accelerated within the metering unit.

13. The method as recited in claim 1, wherein the airflow enters into and exits from the outlet tube at a speed that is greater than a feed speed at which the airflow enters into the feed line.

14. A regulatable arrangement for metering granular material within a distribution unit of a distribution machine, wherein the granular material is carried and conveyed in approximately equal spacing by an airflow directed through a feed line and into a metering unit, wherein the airflow and granular material is guided within the metering unit along an approximately circular arc path and is tangentially directed into an outlet tube positioned adjacent to the metering unit, with at least one conveyor disk or fan disk, which is electromotively driven at a regulatable rotational speed and which rotates approximately concentrically within the metering unit to circulate within the metering unit the airflow carrying and conveying the granular material directed through the outlet tube, and with at least one device operable to detect a torque of an electromotive drive of the at least one rotating conveyor disk or fan disk and is further operable to vary a speed of the electromotive drive if a detected torque is outside of a definable target range.

15. The arrangement as recited in claim 14, wherein devices for the detection and evaluation of sensor values from at least one grain flow sensor positioned in the outlet tube, wherein the sensor values are used to regulate the speed of the electromotive drive.

16. A sowing apparatus for granular material, comprising a plurality of rows located next to each other, each row comprising a sowing unit or seed drill coulter for placing individual grains of the granular material into the soil at a definable placement depth, wherein the sowing units or seed drill coulters are supplied with granular material from at least one grain storage hopper via respectively separate feed tubes, wherein each of the sowing units or seed drill coulters is equipped with one regulatable arrangement for metering granular material as recited in claim 14, wherein each of the regulatable arrangements for metering granular material are in communication with a central control unit operable to process motor torques measured in the metering units, and is further operable to regulate a distance between grains for each sowing unit or seed drill coulter by varying a drive speed of the electromotive drive of each sowing unit or seed drill coulter to achieve a grain spacing or longitudinal distribution of grains within a predetermined target value.

17. The sowing apparatus as recited in claim 16, wherein at least one grain flow rate sensor is arranged in each of the outlet tubes, wherein each of the grain flow rate sensors is in communication with the central control unit, wherein the central control unit is further operable to use sensor values of the grain flow rate sensors to regulate the spacing or the longitudinal distribution of the granular material.

18. A metering apparatus for granular material within a distribution unit or sowing unit of a distribution machine or sowing machine wherein granular material is carried and conveyed by an airflow directed through a feed line into a metering unit and guided within the metering unit along an arcuate path and into an outlet tube adjacent to the metering unit, wherein the metering unit comprises at least one rotating element electromotively driven at a regulatable rotational speed, wherein the rotating element rotates approximately concentrically within the metering unit for the circulation of air and granular material within the metering unit and out through the outlet tube with the granular material being conveyed in the outlet tube in approximately equal spacing, wherein the metering system further includes at least one torque sensor for detecting a torque of an electromotive drive of the at least one rotating element, wherein the at least one torque sensor is in communication with a controller operable to vary a speed of the electromotive drive if a torque detected by the torque sensor is outside of a definable target range.

19. The metering apparatus as in claim 18 further comprising at least one grain flow sensor arranged in the outlet tube and in communication with the controller for adjusting the speed of the electromotive drive in response to a value detected by a grain flow sensor, the value corresponding to the flow of granular material.

20. The metering apparatus as in claim 18 further comprising at least one sensor for detecting a drive speed of the distribution machine or sowing machine and in communication with the controller for adjusting the speed of the electromotive drive in response to the detected drive speed.

21. A method for metering granular material within a distribution unit or sowing unit of a distribution machine or sowing machine in which granular material is carried and conveyed by a stream of air directed through a feed line into a metering unit and guided therein along an approximately circular arc path and into an outlet tube adjacent to the metering unit, wherein the method comprises electromotively driving a drive motor connected to at least one conveyor disk or fan disk which rotates approximately concentrically within the metering unit for moving or circulating the stream of air within the metering unit, and adjusting a speed of the drive motor on the basis of a detected torque of the drive motor.

22. The method as in claim 21, wherein the detected torque of the drive motor is derived from an electrical current consumption of the drive motor.

23. The method as in claim 21, wherein the speed of the drive motor is increased or reduced based on the detected torque of the drive motor of the at least one rotating conveyor disk or fan disk until the detected torque is within a definable target range.

24. The method as in claim 21 further comprising analyzing a detected value of a grain flow sensor arranged in the outlet tube and using the detected value of the grain flow sensor to adjust the speed of the drive motor.

* * * * *